United States Patent
Gugaliya et al.

(10) Patent No.: US 10,429,823 B2
(45) Date of Patent: Oct. 1, 2019

(54) METHOD FOR IDENTIFYING A SEQUENCE OF EVENTS ASSOCIATED WITH A CONDITION IN A PROCESS PLANT

(71) Applicant: ABB Schweiz AG, Baden (CH)

(72) Inventors: Jinendra Gugaliya, Bangalore (IN); Naveen Bhutani, Bangalore (IN); Kaushik Ghosh, Bangalore (IN); Nandkishor Kubal, Bangalore (IN); Vinay Kariwala, Bangalore (IN); Wilhelm Wiese, Bangalore (IN)

(73) Assignee: ABB Schweiz AG, Baden (CH)

( * ) Notice: Subject to any disclaimer, the term of this patent is extended or adjusted under 35 U.S.C. 154(b) by 228 days.

(21) Appl. No.: 15/539,653

(22) PCT Filed: Dec. 29, 2015

(86) PCT No.: PCT/IB2015/060024
§ 371 (c)(1),
(2) Date: Jun. 23, 2017

(87) PCT Pub. No.: WO2016/108182
PCT Pub. Date: Jul. 7, 2016

(65) Prior Publication Data
US 2017/0371319 A1 Dec. 28, 2017

(30) Foreign Application Priority Data
Dec. 29, 2014 (IN) ............................ 6652/CHE/2014

(51) Int. Cl.
*G05B 19/4063* (2006.01)
*G05B 19/418* (2006.01)
(Continued)

(52) U.S. Cl.
CPC ......... *G05B 19/4184* (2013.01); *G05B 23/02* (2013.01); *G05B 2219/31121* (2013.01); *G05B 2219/36487* (2013.01); *G10L 15/265* (2013.01)

(58) Field of Classification Search
CPC . G05B 19/4099; G06F 3/1218; G06F 3/1247; G06F 17/50; B33Y 50/02; B29C 64/393
See application file for complete search history.

(56) References Cited

U.S. PATENT DOCUMENTS 6,085,428 A * 7/2000 Casby ................. B60S 5/00
33/286
6,477,437 B1 * 11/2002 Hirota ................. G06Q 10/10
700/108
(Continued)

OTHER PUBLICATIONS

International Search Report, International Application No. PCT/IB2015/060024, dated Apr. 13, 2016, 3 pages.
(Continued)

*Primary Examiner* — Daniel Abebe
(74) *Attorney, Agent, or Firm* — Barnes & Thornburg LLP

(57) ABSTRACT

The invention provides a method for identifying a sequence of events associated with a condition in a process plant using a control system. The method comprises recording process data, which is timestamped, and recording audio input from each personnel of a plurality of personnel of the process plant. The audio input is synchronized according to time with the process data. A keyword is identified from the temporally synchronized content of each audio input, and compared with the process information of one or more of an event and an equipment, for identifying at least one of a new process information and a supplementary process information related to the condition. One or more of the new process information and the supplementary process information identified for each keyword, and the plurality of events
(Continued)

identified from the process data, are used for identifying the sequence of events associated with the condition.

6 Claims, 3 Drawing Sheets

(51) Int. Cl.
  *G05B 23/02* (2006.01)
  *G10L 15/26* (2006.01)

(56) References Cited

U.S. PATENT DOCUMENTS

| | | |
|---|---|---|
| 9,642,184 B2 * | 5/2017 | Plocher .................. G10L 15/22 |
| 2002/0069072 A1 | 6/2002 | Friedrich et al. |
| 2006/0205389 A1 | 9/2006 | Oeberg et al. |
| 2008/0062280 A1 * | 3/2008 | Wang .................... G06F 19/321 |
| | | 348/231.99 |
| 2014/0341528 A1 | 11/2014 | Mahate et al. |

OTHER PUBLICATIONS

International Written Opinion, International Application No. PCT/IB2015/060024, dated Apr. 13, 2016, 4 pages.
International Preliminary Report on Patentability, International Application No. PCT/IB2015/060024, dated Jul. 4, 2017, 5 pages.

* cited by examiner

METHOD FOR IDENTIFYING A SEQUENCE OF EVENTS ASSOCIATED WITH A CONDITION IN A PROCESS PLANT

CROSS-REFERENCE TO RELATED APPLICATIONS

This application is a U.S. national stage of International Application Serial No. PCT/IB2015/060024, filed Dec. 29, 2015, which claims priority to Indian Patent Application No. 6652/CHE/2014, filed Dec. 29, 2014. The entire disclosures of both of the foregoing applications are hereby incorporated by reference.

FIELD OF THE INVENTION

The invention relates to controlling processes in a process plant. More specifically, the invention relates to diagnosis of conditions in a process plant.

BACKGROUND OF THE INVENTION

Plant process control is performed through a centralized control room, where a set of plant operators remotely control and monitor different plant processes. Often such remote process control needs coordination and communication with field technicians and operators. Such communication is performed by the control room operator to get field information, and also to coordinate the local plant operator, to regulate the process at the plant. The field operators also communicate with the central control room, any abnormal observation in the field and/or to confirm some of the control actions taken by the field operator locally.

In case of plant transitions such as startup or shutdown, product grade change over, production rate change and so forth, the communication becomes vital, as such events call for close coordination between the field and control room operators. Additionally, the control room operators may also get instructions from plant personnel regarding production rate, product grade, maintenance etc. over different communication channels.

Currently, such communication is performed as and when needed by the central control room operator, field operator and higher management. However, this vital information exchange is not recorded, and hence cannot be used for event analysis, root cause identification, detecting the reasons for certain abnormal actions by the field or control room operator. Most of the analysis is performed using the historical process data stored in a database of the control system. However, the voice information which includes contextual information about plant state, recommendations made, actions taken, local observations made etc., is ignored from the analysis.

Accordingly, there is need for an improved method and system for controlling processes in a process plant based on process data, and communication data.

SUMMARY OF THE INVENTION

Various aspects of the invention provide a method for identifying a sequence of events associated with a condition in a process plant using a control system.

The method comprises recording process data of one or more field devices of the control system, wherein the process data is timestamped. The method also comprises recording audio input from each personnel of a plurality of personnel of the process plant, in relation to the condition in the process plant, wherein the audio input is tagged according to identity information of the corresponding personnel. In addition, the method comprises temporally synchronizing content of each audio input with process information of at least one of an equipment related with the condition and an event from a plurality of events. Here, the process information of at least one of the equipment and the event, is identified from the process data.

Moreover, the method comprises identifying a keyword in the temporarily synchronized content of each audio input. Additionally, the method comprises comparing each keyword with the process information of at least one of the related equipment and the related event, for identifying at least one of a new process information and a supplementary process information related to the condition, from the temporally synchronized content of the corresponding audio input.

Subsequently, the sequence of events associated with the condition is identified, based on at least one of the new process information and the supplementary process information identified for each keyword, and the plurality of events identified from the process data.

BRIEF DESCRIPTION OF DRAWINGS

The subject matter of the invention will be explained in more detail in the following text with reference to exemplary embodiments which are illustrated in attached drawings in which.

DETAILED DESCRIPTION

Figure 1:
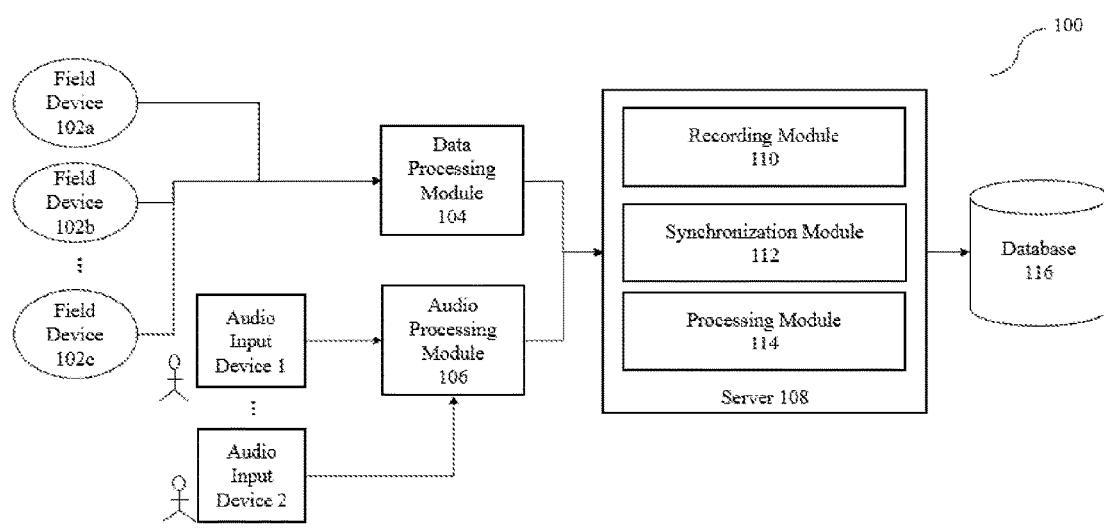
FIG. 1 is a simplified representation of a control system for identifying a sequence of events associated with a condition.

Referring to FIG. 1, which is a simplified representation of a control system (100). The control system is for controlling one or more processes including, but not limited to, paper production, oil production, cement production and steel manufacturing. The one or more processes are performed in a process plant such as, but not limited to, a paper plant, a steel plant and a cement plant.

As illustrated, the control system comprises one or more field devices (e.g. 102a, 102b, 102c etc.). Sensors and/or actuators of the one or more field devices collect process data (e.g. temperature, pressure, speed etc.). The process data can be collected directly from the sensors, or from one or more controllers of the field devices. The process data can be processed at a data processing module (104). Examples of such processing include, but is not limited to, data aggregation, and filtering, outlier removal, missing data correction.

The control system also comprises one or more audio input devices (e.g. audio input device 1, audio input device 2 etc.). The audio input devices can be microphones (or devices having microphones or audio recording capability), attached with a field device, or carried by personnel (e.g. field engineer). An audio input device can receive audio input from a personnel located at the process plant. Alternately, an audio input device can receive audio input from a personnel over a communication channel. An audio input device may also require a personnel to self-authenticate before the recording is enabled.

Each audio input device also comprises, or is linked with, a tagging module (not shown in figures). The tagging module adds one or more tags to the audio input received at the audio input device. For example, an identity tag can be added along with the recording of the audio input. Taking another example, timing information can be added while recording the audio input. Examples of such tags include RFID tags, NFC tags, barcodes, QR codes etc.

The audio input received from each personnel of the plurality of personnel at the one or more audio input devices, is processed at an audio processing module (106). For example, the audio input received from a personnel can be processed to remove noise, identify certain keywords and so forth.

The process data from the one or more field devices, and the audio input from the plurality of personnel, is provided to a server (108). The server includes one or more modules for performing one or more functions. In the embodiment illustrated in FIG. 1, the server has a recording module (110), a synchronization module (112) and a processing module (114).

The recording module records one or more of the process data, and the audio input, at a database (116). Here, the recording module can record the process data with timestamps. Further, the audio input from each personnel in relation to a condition in the process plant, can be recorded. The record of each audio input also has one or more tags (e.g. of identify information). In addition, the record of each audio input may have certain metadata such as, but not limited to, time/duration of the record, the number of voices in the record, and the size of the record.

The synchronization module temporally synchronizes content of each audio input with process information of one or more of an equipment related to the condition, and an event from a plurality of events. Here, the process information of one or more of the equipment and the event is identified from the process data.

The processing module processes the temporally synchronized content of each audio input. The processing includes identifying a keyword in the temporally synchronized audio input. The processing also includes comparing each keyword with the process information of one or more of the related equipment and the related event. Here, the comparison is performed for identifying at least one of a new process information and a supplementary process information related to the condition, from the temporally synchronized content of the corresponding audio input. Further, the processing includes identifying a sequence of events associated with the condition based on one or more of the new process information and the supplementary process information identified for each keyword, and the plurality of events identified from the process data.

The server can optionally include a control module. The control module can perform one or more control operations according to the processing performed by the processing module.

Figure 2:
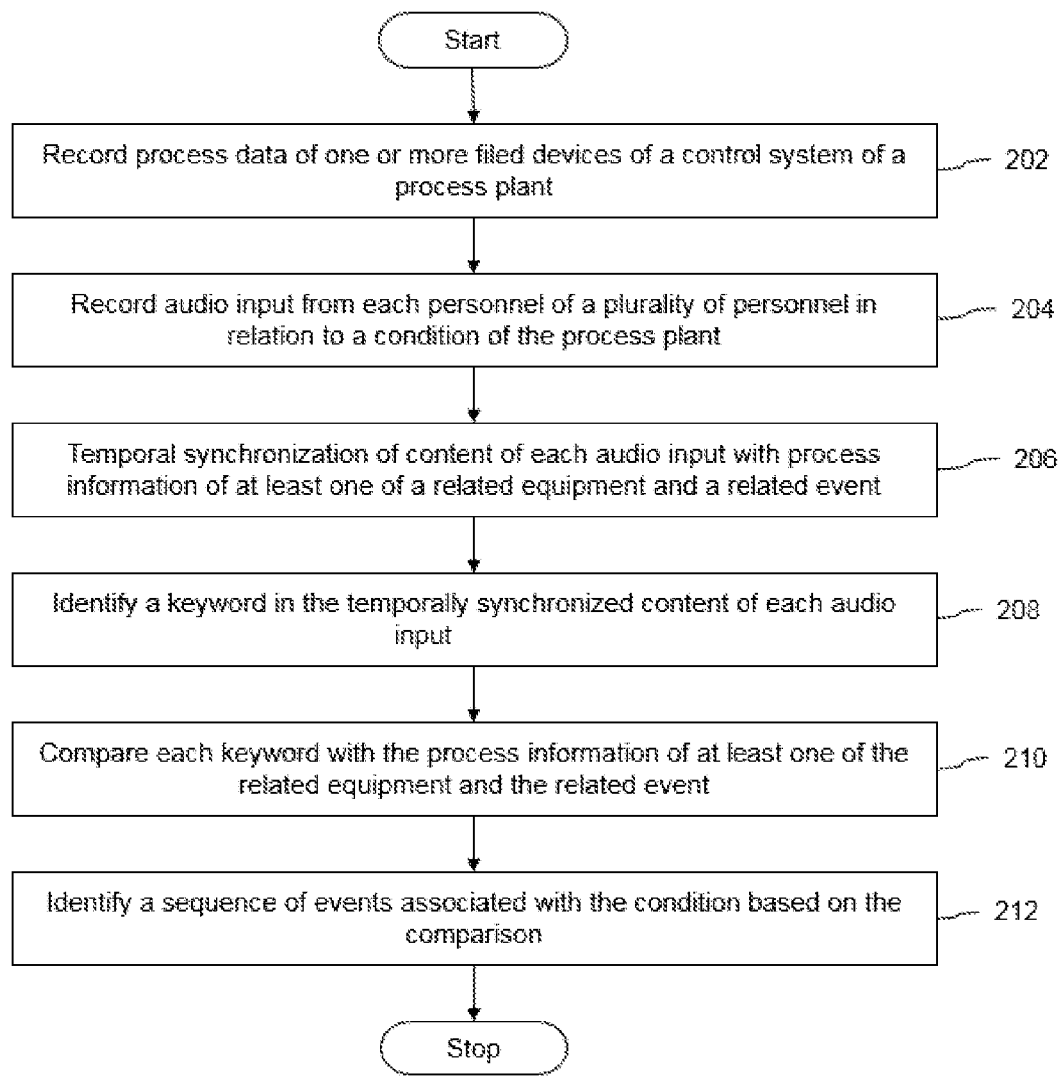
FIG. 2 is a flowchart of a method for identifying the sequence of events.

Moving on to FIG. 2, which is a flowchart of a method for identifying the sequence of events. The method may be implemented by the control system (100), or by a controller(s) thereof (not shown in FIG. 2).

At 202, process data of the one or more field devices (e.g 102a, 102b, 102c etc.) is recorded. The process data is recorded with timestamps. For example, process data (e.g. operating temperature, speed etc.) regarding operation of a process equipment (e.g. boiler, motor etc.) can be recorded with timestamps. The process data is collected from the sensors of the one or more field devices, or from one or more controllers of the one or more field devices. The process data includes one or more events and is indicative of one or more conditions in the process plant. As an example, the process data includes an event that the boiler pressure has exceeded a threshold value, which can suggest a failure in a pressure relief valve of the boiler.

Audio input from each personnel of a plurality of personnel in relation to a condition of the process plant is recorded at 204. It should be noted that the steps 202 and 204 can run parallelly, and not sequentially. In other words, the recording of process data can happen simultaneously, while the audio input is recorded. In some embodiments, the process data is recorded at a different time that the recording of the audio input. For instance, in cases where the process parameters are changed based on a communication between one or more field personnel, the communication is recorded prior to change of the process parameters.

The record of each audio input also has one or more tags (e.g. of identify information). In addition, the record of each audio input may have certain metadata such as, but not limited to, time/duration of the record, the number of voices in the record, and the size of the record.

Accordingly, at 206, content of each audio input is temporally synchronized with process information of one or more of an equipment related with a condition, and an event from a plurality of events. Here, the process information of the equipment and/or the event is identified from the process data.

Figure 3:
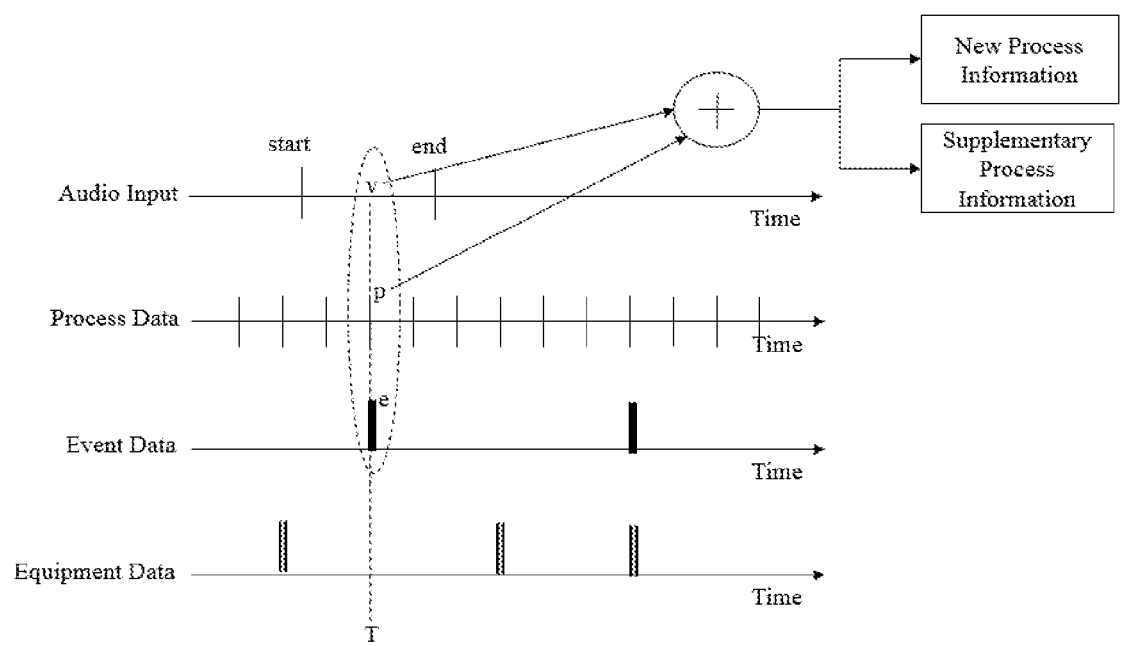
FIG. 3 is a simplified diagram showing processing of process data and audio input.

As shown in FIG. 3, the process data has various samples with timestamps. An event can be identified from a sample(s) according to a criteria. Further, an event can be related with an action. The event can be one of a plurality of types including, but not limited to, an alarm, a fault, and a failure of equipment. In other words, event herein refers to a situation where one or more process data (corresponding to process parameters) have deviated from a normal level. Additionally, an operation of an equipment can be identified from a sample(s) according to a criteria. For example, a motor powering on, or a change in boiler pressure can be identified from the process data. This information may be identified from one or more tags associated with the equipment.

The temporal synchronization of the content of each audio input with the process information comprises relating the process data with a corresponding content of the audio input according to the timestamps of the process data, and the time information of the audio input, according to an event and/or equipment operation. In other words, the audio input is synchronized according to time with process data according to the event or equipment operation. For example, voice data of a field engineer (of a boiler) is synchronized with the process data at the instant of time where the boiler trips (event/equipment operation).

Consider the case in FIG. 3, wherein the voice data sample can have a start and end as shown in the figure. Here, an event 'e' is identified in process data 'p' at instant of time 'T'. For this event, the corresponding voice data 'v' is identified and related with the process data. This process is repeated for all the events/equipment operations, thereby synchronizing the content of each audio input with the process information of the corresponding event and/or equipment operation.

At 208, a keyword is identified in the temporally synchronized content of each audio input. The keyword is one of, but not limited to, an equipment name, a tag of a device, and an action to be carried out by an operator. In an embodiment, the keyword is identified using a list of predetermined keywords. For example, a list of keywords is available with the control system (e.g. stored in database). The control system is capable of identifying the list of keywords from a plurality of inputs including engineering documents and technical specifications of the plant. For example, the control system can identify the keyword 'valve 410' from a P&I diagram.

In another embodiment, the keyword is identified using text present in the process data. For example, the process data includes tag of an equipment 'boiler 110'. Accordingly, voice content corresponding to boiler 110 is identified from the audio input.

This identification of keywords involves processing the audio input. For example, noise is removed from the collected audio input. Subsequently, text tokens (e.g. after converting voice to text) are identified and compared with a list of predetermined keywords. Accordingly, the presence of one or more keywords in the temporally synchronized content of each audio input is identified.

Thereafter, at 210, each keyword is compared with the process information of one or more of the related equipment and the related event. Consider that a tag of an equipment 'motor 210' and a corresponding action 'change RPM to 5000' is identified in the audio input. The process data of the corresponding equipment/time is analyzed to determine if a corresponding information exists in the process data. For instance, an event showing a change in motor speed could be present in the process data. Such comparison is performed for each keyword identified at 208.

The comparison at 210, may lead to identification of one or more of a new process information and a supplementary process information (also refer FIG. 3). For example, the audio input may have a command to open a valve, while the process data may not show a valve operation, thereby revealing a process information, which was previously not available. Taking another example, the audio input may have a command for enhancing power supply by 10%, while the process data shows enhancement of power supply by 20%, thereby revealing additional information, which was previously not available.

Subsequently, at 212, the sequence of events associated with the condition is identified. The identification is based on one or more of the new process information and the supplementary process information identified for each keyword, and the plurality of events identified from the process data. Here, the sequence of events includes events sorted according to time. The event information from process data is used to get an initial sequence of events, while the information found at 210, is used to modify the initial sequence of events (e.g. by adding/editing information about events).

Optionally, the method includes performing statistical analysis among the plurality of events utilizing the identified sequence of events. In an embodiment, based on the statistical analysis performed, the method further includes accordingly modifying the criteria of operation of the control system (e.g. root cause analysis, alarm handling, plant maintenance etc.).

The method disclosed herein can be utilized for carrying out various diagnostics/maintenance activities. Consider a case, wherein different plant personnel communicate with each other for carrying out a process in the plant. Also, assume that the personnel use a standard protocol during communication. For example, any operator action or command, would use standard words such as 'START', 'STOP', 'OPEN', 'CLOSE', 'ON', 'OFF', 'RAMP UP', 'RAMP DOWN' etc., while communicating with other operators or field operators. Also, the operator would voice out 'TAG' on which the operation is to be carried out. To give an example, in order to request opening the control valve FIC20A by 10%, the control room operator would give instruction on phone voicing out following command:

"OPEN FIC20A by 10%". (Recorded At 8:00:10 AM)

Additionally, the receiver of this voice communication acknowledges the call with a code word (say acknowledged, done etc.) and then confirms action as follows:

"Acknowledged" (recorded at 8:01:00:15 AM)

"FIC20 A Opened 100%" (recorded at 8:05:00 AM)

The voice command gets recorded, and using speech to text conversion gets converted to text format as well. The command has two keywords namely 'OPEN' associated with an action (opening of a device) and FIC20A' associated with a tag name. Additionally, the voice to text converted acknowledgement message is also compared with pre-defined library of words to identify the acknowledgement of the call or action confirmation (such as acknowledged, opened etc.).

Another example can be the conversation between a control room operator of a cement plant (say operator A) with a control room operator of a power plant (say operator B) as below:

"Operator A: Operator B, increase power set point (PP550.SP) by 10 MW" (recorded at 9:30 AM)

"Operator B: Operator A, your request is acknowledged and accepted" (recorded at 9:31 AM)

Operator B is supposed to increase power output set point (PP550.SP) of the power plant to address the request. However, operator B actually reduces the power output set point by 10 MW.

In this example, due to this mistake, the cement plant trips due to non-availability of power (say at 9:50 AM). The trip event is recorded in the control system as (CP150.Trip) with high severity value (1000). The method automatically identifies the trip event and analyses the log of controller and text converted voice data of a few hours (say 1 hour) prior to the plant trip.

The method identifies that the log of text converted voice data has a reference to tag PP550.SP. The tag was supposed to have an increase of 10 MW. However, the historical controller data indicates that PP550.SP was actually reduced by 10 MW. Hence, the root cause of this trip event is automatically identified. Additionally, the tag of the converted voice to text data indicates the owner of the false action (Operator B) in this case.

Consider a case in a power plant where a central control room operator notices some abnormal signals. The operator sees that the CO (carbon monoxide) emission sensor signal (MCO500.PV) is showing very abrupt fluctuation from high to low values at 10 AM. The control room operator calls the field technician to inspect the sensor. The technician diagnoses the sensor and reports to central room operator that the sensor needs replacement (10:35 AM). However, due to non-availability of staff, the sensor is not replaced.

At 11 AM, the central room operator notices abnormal trend in flue gas exit temperature (TIC522.PV) of the boiler. There are two measurements for flue gas exit temperature measurements. The other redundant sensor (TIC523.PV) shows a normal trend of flue gas exit temperature at this point in time. The central room operator calls another field technician to look into the sensors TIC522.PV and TIC523.PV (11:05 AM).

At the same time, the feed water pump (P509) starts showing abnormal behavior at 11.20 AM. The current draw of the pump shows high peaks. When the central room operator observes the current variable trend, the operator requests field operator (11:25 AM) to inspect the pump system. The field operator inspects the pump system and reports that the pump is showing heavy water leakage and also high noise vibration (11:45 AM).

The plant trips at 11:50 AM with an event id (P5000.trip). Now, the automatic analysis of conversation (between operator and technician) identifies that MCO500.PV (10:00 AM), TIC522.PV (11:05 AM), TIC523.PV (11:05 AM) and P509 (11:25 AM) are mentioned prior to the trip event (11:50 AM). Therefore, the method automatically identifies the hardware related issues, and also ranks them according to time (hardware failure closer to trip event having more probability to contribute to trip event).

The method may also be used for other applications such as, training of field personnel/control room operators, identifying manual errors that effect plant operation(s), performing root cause analysis, generating alerts and so forth.

Thus, the method enables recording of all communication among the plurality of personnel of a process plant. This audio input along with process data is stored and time synchronized. The whole sequence of plant events and associated operator communication can be identified and used for root cause or other analysis. Additionally the tagging of the audio input enables recording the identity name of the personnel automatically in the system, for the analysis.

What is claimed is:

1. A method for identifying a sequence of events associated with a condition in a process plant using a control system, the method comprising:
   recording process data of one or more field devices of the control system, wherein the process data is time-stamped;
   recording audio input from each personnel of a plurality of personnel of the process plant, in relation to the condition in the process plant, wherein the audio input is tagged according to identity information of the corresponding personnel;
   temporally synchronizing content of each audio input with process information of at least one of an equipment related with the condition and an event from a plurality of events, wherein the process information of at least one of the equipment and the event, is identified from the process data;
   identifying a keyword in the temporarily synchronized content of each audio input;
   comparing each keyword with the process information of at least one of the related equipment and the related event, for identifying at least one of a new process information and a supplementary process information related to the condition, from the temporally synchronized content of the corresponding audio input; and
   identifying the sequence of events associated with the condition, based on at least one of the new process information and the supplementary process information identified for each keyword, and the plurality of events identified from the process data.

2. The method of claim 1 further comprising modifying one or more criteria of operation of the control system according to the identified sequence of events.

3. The method of claim 1, wherein recording the audio input from each personnel comprises storing metadata of the audio input.

4. The method of claim 3, wherein the metadata comprises at least one of a time information, and a duration information.

5. The method of claim 1, wherein the step of recording the audio input comprises verifying the identity information of the corresponding personnel.

6. The method of claim 1, wherein the keyword is one of a tag, an equipment, and an action.

* * * * *